(12) United States Patent
Kuenzler et al.

(10) Patent No.: US 7,891,666 B2
(45) Date of Patent: Feb. 22, 2011

(54) DEVICE AND METHOD FOR MEASURING A SHOT FORCE EXERTED ON A MOVABLE GAME DEVICE

(75) Inventors: Udo Kuenzler, Karlsbad (DE); Walter Englert, Burgrieden (DE)

(73) Assignee: Cairos Technologies AG, Karlsbad (DE)

( * ) Notice: Subject to any disclaimer, the term of this patent is extended or adjusted under 35 U.S.C. 154(b) by 1008 days.

(21) Appl. No.: 11/460,565

(22) Filed: Jul. 27, 2006

(65) Prior Publication Data

US 2007/0191083 A1 Aug. 16, 2007

(30) Foreign Application Priority Data

Jul. 29, 2005 (DE) .................. 10 2005 036 355

(51) Int. Cl.
*A63B 63/00* (2006.01)
*A63F 7/20* (2006.01)

(52) U.S. Cl. .................. 273/317; 463/1; 473/198; 273/108

(58) Field of Classification Search .......... 463/1–4; 273/317, 317.1–317.9, 108, 108.1, 108.2, 273/108.3, 108.4, 118 R; 473/131, 150–154, 473/198–200

See application file for complete search history.

(56) References Cited

U.S. PATENT DOCUMENTS

| | | | |
|---|---|---|---|
| 4,577,865 A * | 3/1986 | Shishido ............... 473/570 |
| 4,940,236 A * | 7/1990 | Allen .................. 473/223 |
| 5,150,895 A | 9/1992 | Berger et al. |
| 5,209,483 A * | 5/1993 | Gedney et al. .......... 473/223 |
| 5,375,839 A * | 12/1994 | Pagani ................. 473/570 |
| 5,586,940 A * | 12/1996 | Dosch et al. ........... 473/140 |
| 5,755,634 A * | 5/1998 | Huang ................. 473/570 |
| 5,779,576 A | 7/1998 | Smith, III et al. |
| 5,810,685 A * | 9/1998 | Willner et al. .......... 473/571 |
| 6,073,086 A * | 6/2000 | Marinelli ............. 702/141 |
| 6,151,563 A | 11/2000 | Marinelli et al. |
| 6,157,898 A * | 12/2000 | Marinelli ............. 702/141 |
| 6,196,932 B1* | 3/2001 | Marsh et al. ........... 473/223 |
| 6,582,330 B1 | 6/2003 | Rehkemper et al. |
| 6,884,180 B2* | 4/2005 | Corzilius et al. ........ 473/351 |
| 7,086,955 B2* | 8/2006 | Gobush et al. .......... 473/199 |
| 2002/0134153 A1* | 9/2002 | Grenlund .............. 73/493 |
| 2004/0082414 A1* | 4/2004 | Knox .................. 473/564 |
| 2005/0085316 A1 | 4/2005 | Barr |
| 2005/0128128 A1 | 6/2005 | Lo et al. |

FOREIGN PATENT DOCUMENTS

| | | |
|---|---|---|
| DE | 200 04 174 U1 | 7/2001 |
| DE | 103 38 620 | 3/2005 |
| EP | 1 232 772 | 8/2002 |
| FR | 2 667 510 | 4/1992 |
| WO | 01/66201 A | 9/2001 |
| WO | 044396 | 5/2005 |

* cited by examiner

*Primary Examiner*—John M Hotaling, II
*Assistant Examiner*—Ryan Hsu
(74) *Attorney, Agent, or Firm*—Michael A. Glenn; Glenn Patent Group

(57) ABSTRACT

For measuring a shot force exerted on a movable game device, a time curve of the acceleration during the shot or of the pressure within the game device during the shot is recorded and processed to obtain an energy measure, said energy measure then serving to provide information about the shot force.

10 Claims, 8 Drawing Sheets

FIGURE 6d
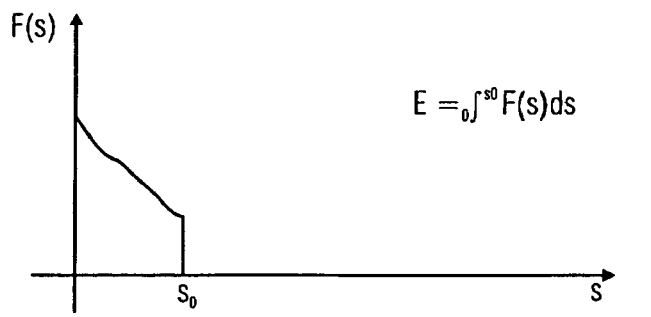
$s_0$: point on the ball's locus at which it leaves the foot
FIGURE 6e
| energy measure | force of shot |
|---|---|
| very little | 1 |
| little | 2 |
| . | . |
| . | . |
| . | . |
| a lot | 10 |
FIGURE 7
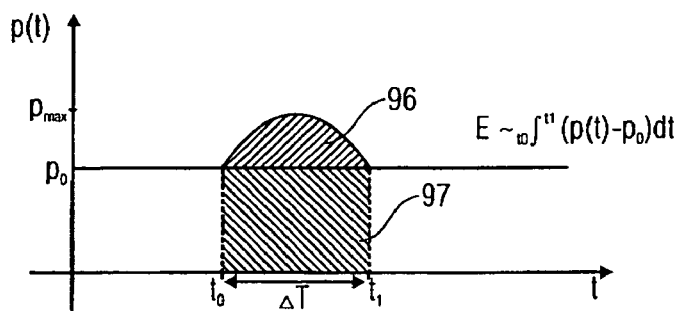

DEVICE AND METHOD FOR MEASURING A SHOT FORCE EXERTED ON A MOVABLE GAME DEVICE

CROSS-REFERENCE TO RELATED APPLICATION

This application claims priority from German Patent Application No. 102005036355.5, which was filed on Jul. 29, 2005, and is incorporated herein by reference in its entirety.

BACKGROUND OF THE INVENTION

1. Field of the Invention

The present invention relates to movable devices and in particular to game devices such as balls, and to concepts for detecting any contact of an object with the movable device.

2. Description of Prior Art

For quite some time, various interest groups have wished to study and understand the sequence of movements of moving objects and/or persons, which requires an exact indication of the object's position in space and time. What is of particular interest here are, among other things, game balls, in particular in commercialized types of sport, such as footballs, or soccer balls, which are highly accelerated in three-dimensional space, as well as tennis or golf balls. The question of who was the last to touch the object of the game, how it was hit and in which direction it was accelerated further may be decisive for the outcome of the game, depending on the type of game.

Game devices that are used in high-performance sports, such as tennis balls, golf balls, footballs and the like, nowadays can be accelerated to extremely high speeds, so that the detection of the object during the movement requires highly sophisticated technology. The technical means employed so far—mainly cameras—either completely fail to meet the requirements set forth above, or meet them only to an insufficient degree; also the methods, hitherto known, for position finding by means of various transmitter and receiver combinations still leave a large error margin with regard to the spatial resolution of the position indication, with regard to the ease of use of the transmitter/receiver components required, and above all with regard to evaluating the data obtained by means of the transmitter/receiver system, so that it is not yet possible, or at least requires a large amount of effort, to evaluate the results obtained from this data as fast as possible.

It is not only in the field of commercial sports, where movable game devices may be employed, but it is also in the personal field that users have become more and more used to electronic devices indicating various pieces of information to give a user feedback as to how he/she has affected an object, or to provide him/her with information about how a player has affected a gaming device.

Current statistics methods in commercial applications, such as of the German first football division (Bundesliga), work with recording relatively simple statistics, such as the percentage of ball contacts of a team or the number of corners, free kicks or fouls.

On the other hand, there have been means, for example in tennis, where there is a very plannable, clearly arranged environment with only two players, which measure, for example, the speed of the tennis ball at the serve, such that a viewer is in a position to assess whether a serve was "hard" or "soft".

What is problematic about such speed measurements which may occur by optical methods is the fact that they do not function within an environment where there is a muddle of players, such as on a football pitch where there are not only two persons being active, but 22 persons, who, in addition—unlike in tennis for a serve—are not positioned in more or less the same place but may form any constellation on the pitch. On the other hand, particularly in football, it is interesting, both for the feedback of the players in training and for the viewers to know, for example, how a shot actually came about and/or how large the force of the shot was.

Thus, kicking a ball in football or soccer or hitting a ball in tennis represents the actual "base" impact, as it were, on the game device which is always decisive of how the game continues, since ultimately everything is about doing something with the movable game device, such as playing it into an opponent's field (as in tennis) or moving it into a goal (as in football, or soccer) or into a basket (as in basketball) or to cause it to contact the floor of the opponent's pitch (as in volleyball). Due to the difficulty of the continuously changing constellations in dynamic games, in particular team games, however also in tennis when no serve is currently played, but the ball is played in one move, external speed measurements will fail, which has lead to the fact that there are currently no shot force detection systems that could be employed in a flexible manner.

On the other hand, for the field of sports, but also for the field of leisure, there is a further limitation resulting from the fact that these fields are highly commercialized. All systems providing additional information, in particular when they are intended for leisure of for leisure sports, must enable to be offered at a low price since they are objects which a user never "absolutely needs" but might like to have anyway. Particularly in such a market, it is decisive to be able to offer a robust system at low price. For example, a system must not require a high level of maintenance or of equipment such as, for example, a speed measurement system for measuring the serve of a tennis player. Due to the relatively high cost associated, a small tennis club would never acquire such a system for training purposes, which applies even more to a private person who wishes to play tennis in a slightly more ambitioned manner in his/her leisure time.

It is the object of the present invention to provide a concept for measuring a shot force exerted on a movable game device, the concept being applicable in a flexible manner while being low in expense.

In accordance with a first aspect, the invention provides a device for measuring a shot force exerted on a movable game device, including:

a provider for providing a time curve, which occurs when the game device is impacted by an object, of an acceleration acting upon the object, or a time curve of a pressure of the game device;

a processor for processing the time curve of the acceleration or the time curve of the pressure to obtain an energy measure which depends on an energy transferred onto the object by the shot;

a provider for providing information about the shot force on the basis of the energy measure.

In accordance with a second aspect, the invention provides a movable game device including:

an acceleration sensor for providing a time curve of an acceleration, or a pressure sensor for providing a time curve of a pressure of the game device which occurs while an object impacts the game device; and an outputter for outputting the time curve of the acceleration or pressure.

In accordance with a third aspect, the invention provides a method for measuring a shot force exerted on a movable game device, the method including the steps of:

providing a time curve, which occurs when the game device is impacted by an object, of an acceleration acting upon the object, or a time curve of a pressure of the game device;

processing the time curve of the acceleration or the time curve of the pressure to obtain an energy measure which depends on an energy transferred onto the object by the shot;

providing information about the shot force on the basis of the energy measure.

In accordance with a fourth aspect, the invention provides a computer program having a program code for performing the method for measuring a shot force exerted on a movable game device, the method including the steps of:

providing a time curve, which occurs when the game device is impacted by an object, of an acceleration acting upon the object, or a time curve of a pressure of the game device;

processing the time curve of the acceleration or the time curve of the pressure to obtain an energy measure which depends on an energy transferred onto the object by the shot;

providing information about the shot force on the basis of the energy measure, when the program runs on a computer.

The present invention is based on the findings that a shot-force measurement which is accurate, low in maintenance and, at the same time, may be used in a flexible manner may be achieved in that a time curve of an acceleration or a time curve of an internal pressure of a movable game device is provided so as then to process this time curve, specifically with the aim of obtaining a measure of energy which depends on the energy transmitted to the object by the shot. In addition, a means for providing information about the force of the shot is provided which uses the synergy measure for determining the force of the shot. Thus, in accordance with the invention, what is performed is not direct speed measurement but, in preferred embodiments, at the most an indirect speed measurement, to the effect that a temporal acceleration curve and a temporal pressure curve are detected, and that is these time curves, or temporal curves, are processed to obtain a measure of energy, that is some quantity which is somehow connected to the energy in a linear or non-linear or in some other manner. This measure is then used in accordance with the invention to provide force-of-shot information. This force-of-shot information may be a quantitative value which is, however, free from units, e.g. on a scale between 1 and 10, or it may be a value on an open-ended scale, or it may be a value representing a force exerted on the movable game device at the time of the shot, or it may be an energy value, i.e. a value of the energy imparted on the movable game device at the shot.

Alternatively, the shot force may also be an indication of length providing a measure of how far the ball would have flown, for example, if the ball had been shot at an optimum angle and without any rotation. Such a shot-force result is interesting, in particular, for ball sports such as soccer or American football, since to the players there, a measure of length, for example how far a pass or kickout will have gone, means more than quantitative values or physical force or energy units. However, for a comparison with other players, the non-unit quantitative scale is highly interesting, whether it is finite or open-ended.

In preferred embodiments, ball contacts are also detected. Here, various components may be employed for both tasks. To this end, the use of two signals having different signal speeds is ideal to achieve a robust but nevertheless efficient and accurate detection of a contact with a movable device. Thus, in accordance with the invention, a detector within the movable device, e.g. in a football, detects whether an object, such as a player's leg, is located in the vicinity of the football. This is effected, for example, by pressure, acceleration or vibration measurement or by non-contact measurement.

Once a detection has been made to the effect that the object is located in the vicinity of the movable device, the transmitter module is controlled to transmit two signals having different signal speeds. A receiver device connected to the object will detect the first signal and then wait for a certain time period for reception of the second signal having a lower signal speed. If the signal having the lower signal speed is detected within the predetermined time period which starts upon reception of the first, fast signal, it shall be assumed that the object which has received both the first and, within the predetermined time period, also the second signal, was in contact with the movable device. This is reflected in that a detector which has detected reception of the second signal within the predetermined time period provides a detector output signal, a memory subsequently storing the fact that there has been a detector output signal, i.e. that it is very likely for a ball contact to have occurred. Alternatively or in addition, an absolute moment in time at which the detector signal has occurred may be stored in the memory, so that when one thinks of a football match, a sequence of moments result which may then, e.g. after a match or during a match, be read out to ascertain, as a function thereof, how many ball contacts a player had, or generally speaking, how many contacts an object had with the movable device.

If one assumes that, e.g., several football players are near a ball, the fast signal will be detected by several receiver devices. However, if the predetermined time duration is selected such that it is very likely that really only that receiver device which is located closest to the movable device can receive the second signal within the predetermined time period, while receiver devices which are more remote will also receive the second signal, but only after the predetermined time duration has expired, no ball contact will be registered for those players.

By setting the predetermined time duration in the receiver devices worn, or carried, by the player, it is thus possible to set the accuracy and/or the range to be detected. For this purpose, no access to the ball itself is required.

In addition, the use of two signals of different speeds allows to dispense with any complicated and, thus, failure-prone electronics in the ball itself. One only needs to make sure that the ball has a proximity detector which operates in a contact-controlled or non-contact manner and which will then control the transmission of the two signals of different delay times. Thus, no complicated electronics are required within the ball itself, which is a considerable advantage in particular since the forces and accelerations acting on the ball may be huge, so that there is a very rough environment for there to be an electronic system within the ball.

On the receiver side, no personal identification or the like is required, which is of considerable advantage—particularly if one considers that what is dealt with here is a mass product, i.e. that may players are to be provided with receiver devices—since thus, all receiver devices may operate in an identical manner and do not require any specific identification, which also renders the receiver devices simple and low in or even completely free from maintenance. In addition, a simple and robust structure also ensures safety from tampering.

BRIEF DESCRIPTION OF THE DRAWINGS

These and other objects and features of the present invention will become clear from the following description taken in conjunction with the accompanying drawing, in which:

FIG. 4b is a more detailed representation of the transmitter module of FIG. 4a;

FIG. 5b is a more detailed representation of the receiver device of FIG. 5a;

FIG. 6d shows a qualitative curve of the force as a function of the distance covered, the force being exerted on a movable game device during a shot;

FIG. 6e shows a preferred allocation table between the energy measure and the force of the shot;

FIG. 7 shows a qualitative curve of the internal pressure of a movable game device;

DESCRIPTION OF PREFERRED EMBODIMENTS

To improve one's skills in a ball game or to be able to compare oneself to other players, objective data must be obtained in a simple manner. This data must be visualized such that a training feedback or a comparison to other players is possible. To this end, respective components are provided within the game device, and, if need be, a data detection device including a display unit is provided.

In a low-cost system, recognition of a person cannot be effected via delay times of the radio signals. To this end, the incoming radio signals would have to be compared to a highly accurate time reference. Also, a network would have to be built within which all times measured are compared to determine that player who is closest to the ball. Therefore, one concludes, from the transmission of a radio signal and an acoustic signal, as to who had the last ball contact.

By measuring the forces acting on the game device, one may also infer the shot force or the rotational speed of the game device. If this entails an energy observation, the individual player can learn to control his/her influence on the game device.

Further advantages result from the further claims and sub-claims and from the following description.

Before the invention will be described in detail, it shall be pointed out that it is not limited to the particular components of the device or to the procedure discussed, since these components and methods may vary. The expressions used here are merely intended to describe particular embodiments, and are not used by way of limitation. If the singular form or indefinite articles are used in the description and in the claims, they also relate to the plural form of these elements, unless the overall context clearly indicates otherwise. The same applies in the opposite direction.

Figure 1:
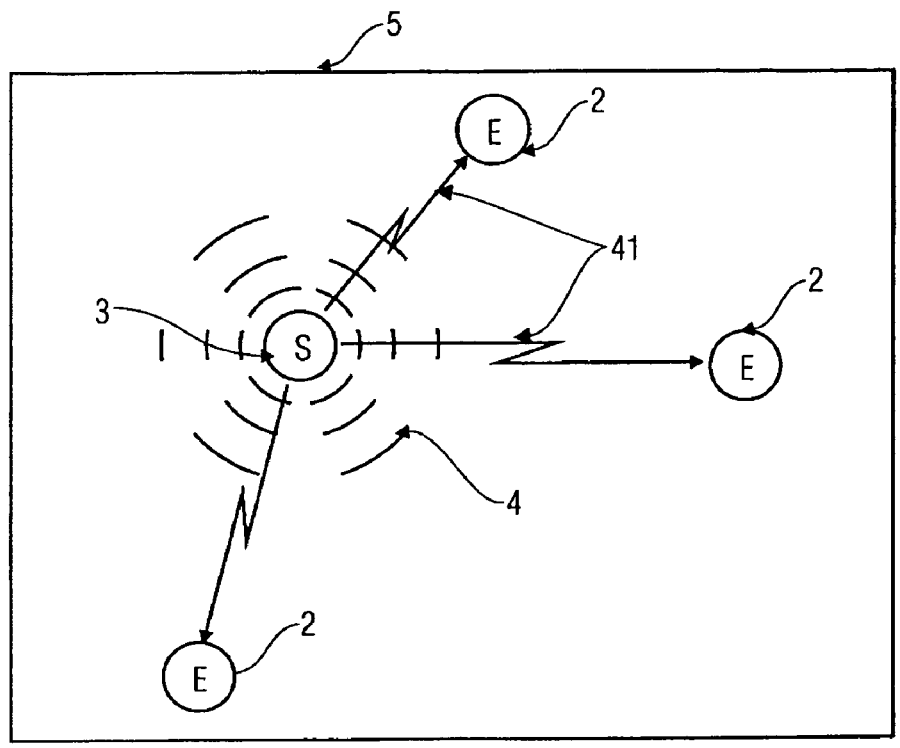
FIG. 1 is a schematic sketch of a pitch including a movable device and several objects provided with receivers.
Figure 2:
FIG. 2 depicts a player with a football as an example of a movable device.
Figure 3:
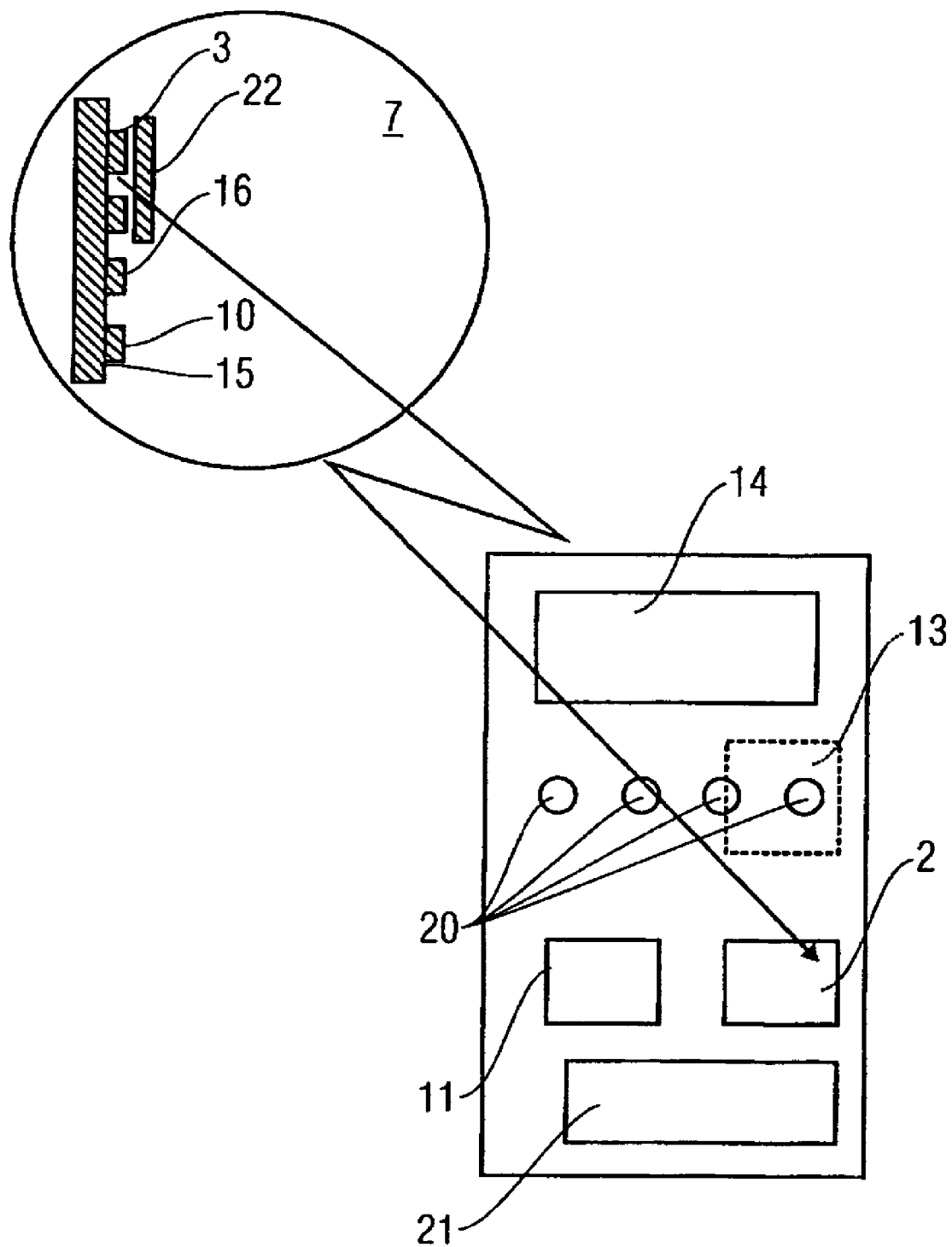
FIG. 3 is a schematic system sketch.

FIG. 3 shows a schematic system sketch. In particular, it shows a device for detecting the force and/or motion ratios on a game device 7, such as a ball, an assembly 15 being provided in the ball which is populated with several electronic components. Instead of the assembly, the electronic components may also be disposed on the ball's jacket, for example on the inside, or be suspended within the center of the ball.

At least one of the following electronic components is provided within the game device:
 a transmitter 4 for acoustic or ultrasonic waves for transmitting an acoustic signal,
 a pressure sensor 10,
 an acceleration sensor,
 at least one Hall sensor 16,
 at least two magnetoresistive sensors,
 at least two coils.

The electronic components are in connection with a receiver 2 via transmitter 4 for the acoustic or ultrasonic waves, or at least via a radio transmitter 3, for example via radio 1, for example to transfer the data detected by the electronic components. In addition, a microcontroller 11 is provided for processing the data. This data can then be transferred to a data detection device 12. An evaluation unit 13 is provided for evaluating the data detected which is presented, if need be, on a display unit 14. Data detection device 12 preferably is associated with at least one player 6, preferably however with all players of a game to thereby perform a localization, for example, of the nearest player, as will be explained later on.

For some games, such as in a football match, it is often interesting to know who had the most ball contacts. To determine this, one must ascertain, during the ball contact, who has touched the ball.

In a low-cost system, recognition of the person cannot be performed via delay times of the radio signals. To this end, the arriving radio signals would have to be compared with a highly accurate time reference, and a network would have to be built wherein all measured times are compared in order to determine that player who is located closest to the ball. Alternatively, the field strength of the transmitter at the ball could be used to estimate a distance. However, this is imprecise.

To keep cost low, the delay time of sound is measured within the device. To this end, game device 7 emits, when recognizing a force being exerted upon it, an acoustic signal as a sound or ultrasound by a transmitter 4. At the same time, a radio transmitter 3 transmits a radio signal. The receiver 2 of a data detection device associated with player 6 registers the acoustic signal and also the radio signal. The time difference yields the distance from the ball. As soon as the radio signal is recognized, the acoustic signal is awaited to arrive for 5 ms. If an acoustic impulse is recognized within this time period, one may assume that receiver 2 of the data detection device 12 associated with player 6 is spaced away from the ball by 1.5 meters at a maximum. It is then very likely that this player has touched the ball. Preferably, each player 6 carries, or wears, such a receiver. The number of acoustic impulses recognized is counted and displayed. Using this information and the hour of the event, one may then determine, in a subsequent interplay of all data of all data detection units 12, how many ball contacts a player 6 had. It is even possible to make statistic statements about how successful passes were, since the target of a pass may be determined by a time comparison. This may be used to detect the following, for example:

Who lost the ball how many times to the opponent?
Were the ball contacts constant over the playing time and was there a drop in performance?
Who played how many passes to whom?
How often did a move pass several players of the same team?

The evaluation unit 13 thus has a means for evaluating whether an acoustic signal of transmitter 4 for the ball or ultrasonic waves arrives within a predetermined time period after the arrival of the radio signal.

Figure 9:
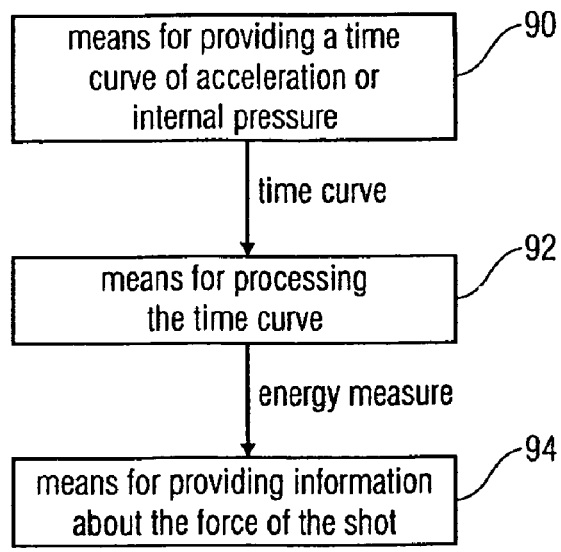
FIG. 9 shows a schematic block diagram of the inventive device for measuring a force of shot exerted on a movable game device.

An inventive device for measuring a shot force exerted on a movable game device is depicted in FIG. 9. The device includes a means 90 for providing a time curve of an acceleration or an (internal) pressure of a movable game device, the time curve occurring when there is an impact on the game device caused by a shot.

Figure 6A:
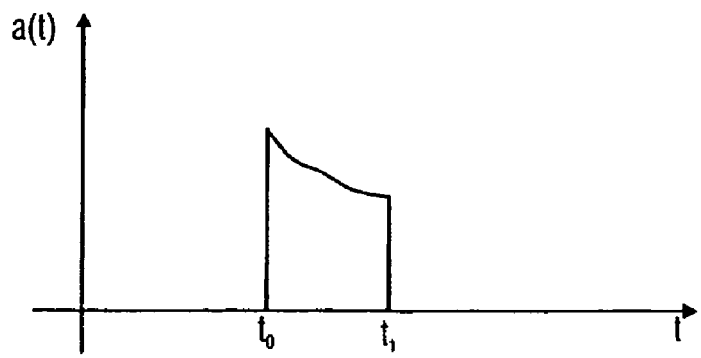
FIG. 6a depicts a qualitative schematic curve of the acceleration over time during a shot.

Depending on the type of sport, the object acting upon the movable game device is a tennis racket, a leg of a football player, a hand of a handball player, a table tennis paddle, etc., if the movable game device is a ball. Because of the fact that an object acts upon the movable game device within the framework of a shot, an acceleration is exerted upon the movable game device which—it being assumed that the movable object was at rest before—was zero, and which, at a time $t_0$ at which the object hits the game device, will suddenly increase and will decrease, as is shown in FIG. 6a, until a time $t_1$ at which the movable game device leaves the object that has impacted the movable game device.

This drop at time $t_1$ may be more or less abrupt, or the case may occur where the acceleration curve a(t) relatively "softly" approximates the value of zero, at which a constant speed is achieved which will become negative at some point in time due to the deceleration caused by air friction. The deceleration of the movable game device due to friction or catching objects is initially irrelevant to the force-of-shot measurement, or is to be taken into account in dependence on the definition of the force of the shot. The latter case will occur when, for example, a distance over which a football would fly is indicated in meters as the force of the shot. Then, the deceleration of the game device by air friction would have to be taken into account, specifically it would have to be taken into account on the basis of the energy measure when calculating the information about the force of the shot.

Figure 6B:
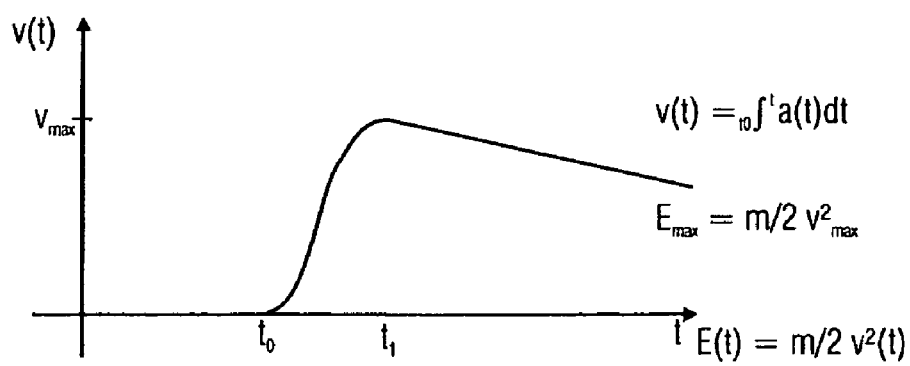
FIG. 6b depicts a qualitative curve of the speed over time during a shot.

Specifically, the device depicted in FIG. 9 includes a means 92 for processing the time curve of the acceleration or the time curve of the internal pressure to obtain an energy measure which depends on an energy imparted onto the object by the shot. This energy measure may be, e.g., the speed at time $t_1$ exerted upon the movable game device by the shot. Such a situation is shown in FIG. 6b. If it shall be assumed, again, that the object was at rest at time $t_0$, its speed will increase due to the acceleration exerted at time $t_0$, and will rise up until time $t_1$. At time $t_1$, for example, the football leaves the football player's leg, and a maximum speed $v_{max}$ is reached which will then decrease again due to air friction. The instantaneous velocity at time t between $t_0$ and $t_1$ may readily be currently calculated by the equation shown on the right-hand side of FIG. 6b.

However, a preferred energy measure is the maximum speed at time $t_1$, since this energy—apart from a potential energy which will typically be negligible—is the energy transferred by the player onto the game device. If the player has transferred a lot of energy, his/her force of shot is high. If, on the other hand, the player has transferred little energy, his/her force of shot was low, provided that for both cases other circumstances of the game device, for example the internal pressure, are comparable, as will be explained in detail later on with reference to FIG. 8.

Thus, means 92 may calculate, for example, the maximum speed as an energy measure, or may even calculate, using the ball mass, the energy associated with the maximum speed and referred to as $E_{max}$.

The device depicted in FIG. 9 further comprises a means 94 for providing information about the shot force on the basis of the energy measure. The functionality of means 94 will be explained with reference to FIG. 6e and may in this case be simply an allocation table which maps the energy measure calculated to a scale between, e.g., 1 and 10, as in the case of FIG. 6e, or to an open-ended scale or to a tendency indication.

A tendency indication would consist in that a comparison of the current energy measure with a previously determined energy measure which was associated with another player is performed so as to be able to state, as the tendency indication, i.e. as information about the shot force, that the shot force of the current player was larger, equal to or smaller than the shot force of the previous player.

Figure 6C:
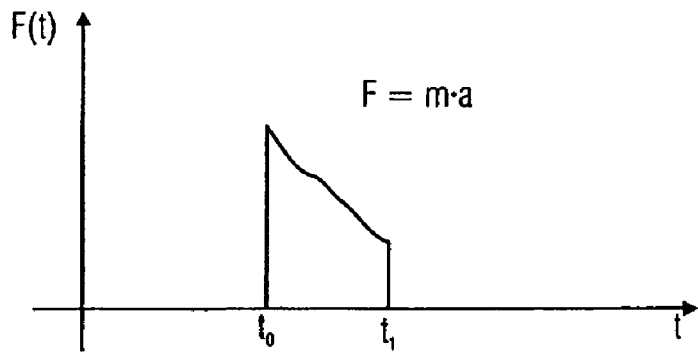
FIG. 6c shows a qualitative curve of the force exerted on the movable game device during a shot.

Mapping the energy measure to force-of-shot information in such a manner may be conducted using any energy measures desired, i.e. even in the event that the force as is depicted in FIG. 6c as a curve over time is evaluated. Thus, the force curve is proportional to the acceleration curve, to be precise with the mass of the movable game device as the proportionality constant. The curve of the force over time also provides an energy measure which could be calculated, for example, by integrating the force over time.

Alternatively, as is shown in FIG. 6d, the directional force exerted on the ball may also be measured as a function of the locus on which the ball moves during the shot. Thus, the force at the location point x=0, at which the ball is located before it is hit by the player's leg, will increase to a high value which will fall down to a certain value. The ball leaves the player's foot at the location point $s_0$ on the locus, so that no more driving force is exerted on the ball, but only deceleration forces which are present due to the air friction and which, however, are not taken into account in FIG. 6d.

Thus, an energy measure also represents the integration of the force measured (acceleration) across the locus covered by the ball. The locus may be measured, for example, at the same time with the acceleration sensor within the ball if the acceleration sensor is an acceleration sensor which operates in a three-dimensional manner and is sensitive in terms of direction. Alternatively, the locus of a projectile may also be calculated in different manners, such as by using highly accurate satellite- or ground-based positioning systems or by accessing predetermined tables. However, micromechanical positioning systems using vibrating gyroscopes may also be employed for determining the locus so as to be able to numerically evaluate the integral depicted in FIG. 6.

However, the preferred embodiment of the present invention is to provide a pressure sensor within the movable game device. When the movable game device is shot, it could have a pressure curve as is qualitatively depicted in FIG. 7. At a time $t_0$, the object hits the movable game device, which will lead to a pressure increase in the movable game device, since the movable game device is deformed by the object impacting the movable game device. This pressure increase will then increase up to a maximum pressure $p_{max}$ and will then decrease again so as to diminish again down to the pressure at rest around time $t_1$ which is characterized in that the movable game device has no more contact with the object.

In accordance with the invention, it has thus been found out that the integral regarding the pressure change, i.e. the area fill within the area shaded in FIG. 7, is connected to the energy exerted on the ball, so that the time curve of the pressure may advantageously be employed for determining the force of the shot.

The utilization of a pressure sensor is particularly advantageous, compared to an acceleration sensor, since the pressure sensor may be configured in a simple manner and to be robust, in comparison with an acceleration sensor which, e.g., has large masses of bending beams. In addition, it is inherent for a pressure sensor not to emit a directional quantity, but to emit a non-directional quantity if it is arranged within the movable game device, which in acceleration sensors could only be achieved by expensive provision of an acceleration sensor array which must be sensitive in three spatial directions. On the other hand, one single pressure sensor is sufficient to provide a pressure curve of the internal pressure of the movable game device.

Thus, utilization of a pressure sensor provides a maintenance-free, robust and, at the same time, low-cost possibility of measuring the pressure curve within a movable game device and of obtaining force-of-shot information, as will be set forth later on with reference to FIGS. 8 and 10.

In a preferred embodiment of the present invention, the pressure curve over time is integrated between $t_0$ and $t_1$, specifically in accordance with the equation as is shown in FIG. 7. This shows that what is integrated is not the absolute pressure curve, but the curve of the pressure change in comparison to the pressure at rest, $p_0$. However, it would also be possible to integrate the absolute pressure curve so as then to subtract area 97 following the integration. This results simply from the product of time duration $\Delta t$ and the pressure at rest.

Figure 8:
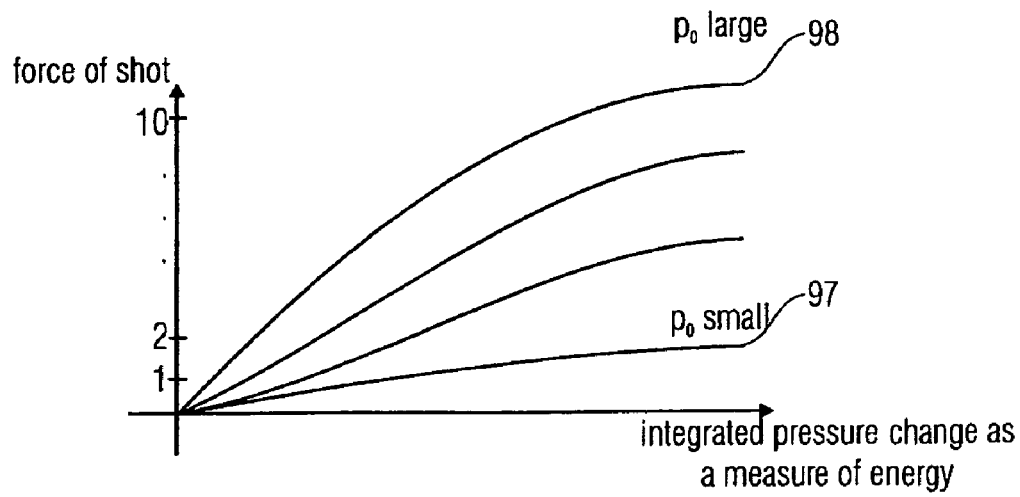
FIG. 8 shows a group of straight lines for determining the shot force using the idle-state internal pressure as the parameter.

As may be seen from FIG. 8, the shot force is highly dependent on the level of the pressure at rest. This result from FIG. 8 on the basis of the various parameter curves, one parameter curve 97 being plotted for a small pressure at rest, $p_0$, whereas a different parameter curve is plotted for a high pressure $p_0$ at 98. In particular, the x axis of the group of curves of FIG. 8 represents the integrated pressure change as a measure of the energy, i.e.—calculated in physical units—a measure which has (Pascal×seconds) as a unit. In illustrative terms, area 96 of the curve shown in FIG. 7 is plotted over the x axis. If one assumes a ball having a small internal pressure, a force-of-shot value will result along the straight line depending on how hard the ball was hit, i.e. how high the shot force is. If, on the other hand, a highly inflated ball is used for playing, a very much higher force of shot has been obtained as a measure of the energy, with the same integrated pressure change, in comparison with curve 97. This is due to the fact that a highly inflated ball is deformed only to a small degree even by a very hard shot, whereas a ball inflated to a very small degree is deformed by a relatively soft shot already, the deformation corresponding to the integrated pressure change.

Alternatively or in addition, the maximum pressure $p_{max}$ of the pressure curve over time may also be determined by means 92 of FIG. 9. Specifically, one may assume, for simpler evaluations, that the curve of the pressure over time, i.e. the manner in which the shot impacts the object, is assumed to be roughly the same for all shots, such that then solely the maximum value will be decisive. In this case, a group of straight lines would be provided which is similar to the group of curves in FIG. 8 but which would not have, as the x axis, an integrated pressure change as the measure of the energy, but the maximum pressure.

As another alternative, one could also determine the time duration of the curve of the pressure deviation which, if typical pressure curves are taken to be approximately the same with regard to their shapes, is also a measure of the energy imparted on the game device during the shot.

Figure 10:
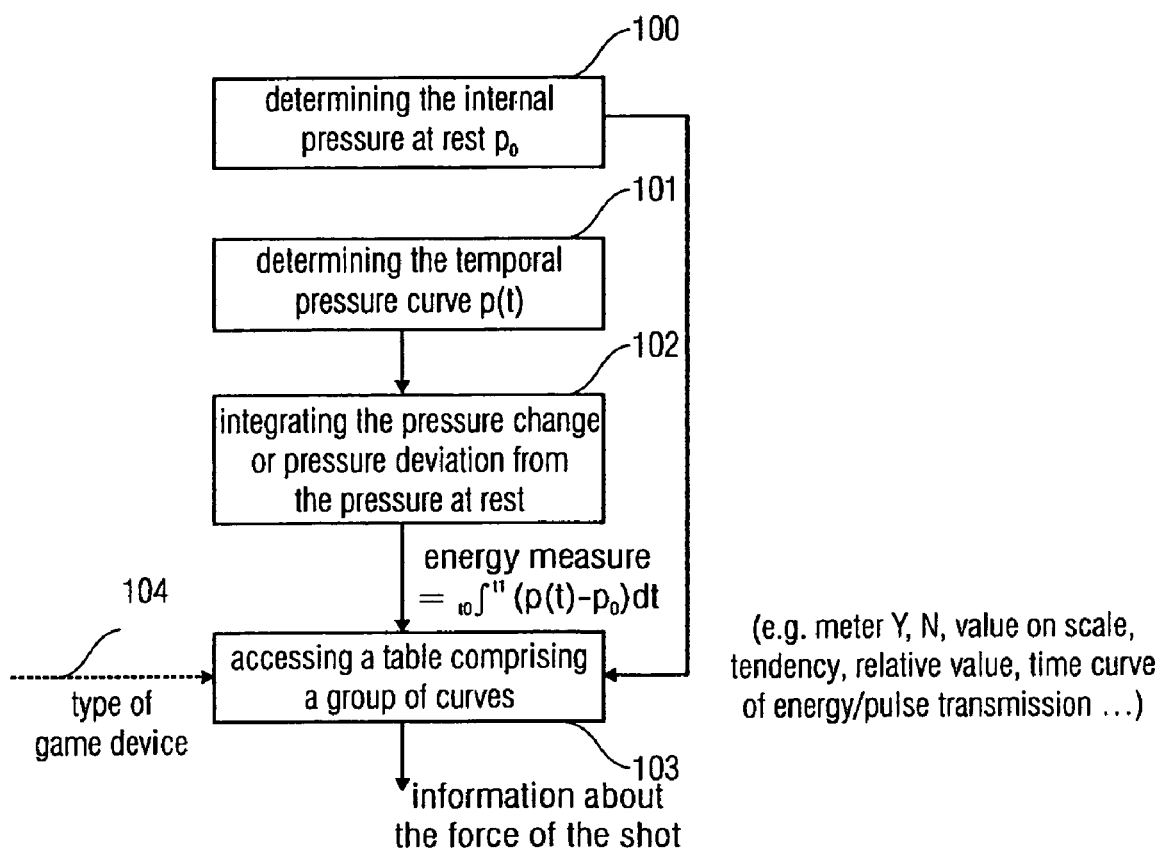
FIG. 10 shows a flow diagram for a preferred force-of-shot measurement by means of a temporal pressure curve.

In a preferred embodiment of the present invention, the internal pressure at rest $p_0$ is initially determined in a step 100, as is depicted in FIG. 10. This determination may either occur prior to or after the shot and is used to select one of the curves in the group of curves of FIG. 8. In addition, the pressure change is integrated over time in a step 102, specifically from time $t_0$ to time $t_1$, using the temporal pressure curve p(t) determined in a step 101. Thus, the integration regarding the pressure change or regarding the pressure deviation from the pressure at rest, set forth in FIG. 102, provides the energy measure which will then be used to determine a value on the parameter curve selected. Preferably, the access made to a table comprising a group of curves is conducted, in a step 103, such that a three-dimensional table is given which comprises groups of three values, a first value of the group of three being the pressure at rest $p_0$, a second value of the group of three being the integrated pressure change, and a third value then being the shot force as is plotted on the y axis of FIG. 8. This force-of-shot information is provided by step 103. When comparing FIG. 9 and FIG. 10, it is obvious that steps 100 and 101 are performed by means 90, that step 102 is performed by means 92, and that step 103 is performed by means 94.

Depending on the implementation of the inventive system, i.e. on the diversity required, information about the type of game device which is fed in at 104 may also be taken into account in step 103. For example, the shot force may depend on whether the ball is a tennis ball or a football. In addition, the shot force will vary from brand to brand. This is relevant particularly when the "ideal range" of the ball, which will then also depend on the surface of the ball, is taken as the shot force. A smoother surface of the ball has a smaller air resistance, so that with the same energy transmitted, the shot force—measured in meters—will be higher than that of a ball having a rougher surface. Nevertheless, both force-of-shot results depend on the energy imparted on the ball, and additionally depend on the type of game device fed in via line 104.

Depending on the implementation, all or only some of the components shown in FIG. 9 will be arranged within the game device itself or within a central device located at a distance from the game device.

In the first embodiment of such a system, only an acceleration sensor or a pressure sensor configured to store a time curve of acceleration or pressure will be located within the game device itself. This time curve of acceleration or pressure may then be transferred, e.g. via a radio transmitter, to a receiver which could be present with the player in the form of a watch, for example. Alternatively, the ball need not necessarily have a radio sensor but may have an output interface which, when the ball is placed into a specifically configured docking station, will read out the stored curves of acceleration or pressure. Then, the processing in block 92 and the provision of force-of-shot information in block 94 would take place in an external station, such as the player's watch or in a central receiving station on a football pitch, etc.

Alternatively, both the functionality of means 90 and means 92 may be integrated into the ball, and the ball already supplies the energy measure to an external receiving station.

This results in that less data must be transferred from the ball to the outside, but that more processor power is required within the game device.

Alternatively, all means 90, 92, 94 may be implemented within the mobile game device, so that only the information about the shot force is indicated by the ball even in a direct manner, or is output via an output interface which may be, e.g., a radio interface or a contact interface.

The system depicted in FIG. 9 also includes the functionality of the external receive interface 6 if only one sensor is present within the ball and if the ball outputs the time curve of the acceleration or internal pressure. Then, means 90 for providing a time curve of acceleration or internal pressure of FIG. 9 is an input interface of the external calculator which additionally also comprises means 92 and means 94.

For example, the inventive device for measuring the shot force may be arranged and implemented fully within the mobile game device or fully outside the game device or partly within and partly outside the mobile game device.

In this sense, the method for measuring a force of shot exerted on the movable game device in such a partial implementation both includes the game device and the evaluation device or only the game device or only the evaluation device.

The invention thus provides detection of the shot force and the flying speed of a game device 7 which may be determined therefrom. Thus, in a football game there is often the question of who has the "hardest" shot. In particular for this embodiment, but also for the other embodiments there is the possibility of integrating the evaluation unit 13 also into the assembly 15 within the game device 7. A sensor measuring the shot force may be mounted in game device 7. This sensor is preferably a pressure sensor 10 or an acceleration sensor. The information of this sensor is measured by an internal microcontroller and transferred, for example, to display unit 14 on data detection device 12 of the player. For determining the shot force, it is necessary to measure the energy the ball has been imparted during the shot. To this end, the evaluation unit 13 has means for detecting the pressure, determined by pressure sensor 10, over time or for detecting the acceleration detected by the acceleration sensor. In addition, provision is made for calculating means for calculating the force applied to ball 7 on the part of player 6 using the pressure curve or acceleration curve.

With the acceleration sensor, the acceleration is measured directly and reported to the microcontroller within game device 7. Said microcontroller calculates the force that has acted upon the ball from the known mass of the ball and the acceleration measured. These calculations also include the aerodynamics and the time curve of the energy transferred to the ball. The calculation comprises not only transferring the overall energy to the evaluation unit 13, but also comprises transferring the time curve of the energy transferral to the ball.

In the alternative use of a pressure sensor 10, one measures how the internal pressure of the ball increases during a shot. These pressure changes and the associated time curve allow the microcontroller within the ball to determine the force that has been exerted on the ball. Using the pressure measurement, it is possible to ascertain how, much the ball was deformed. The higher the level of deformation, the larger the shot force. To this end, the peak value and the pressure curve of the internal pressure are measured using pressure sensor 10. Using a group of curves, the energy supplied to the ball is measured. For example, the group of curves may be determined in advance in a empirical manner, by means of a shooting system and is different for each type of ball.

Then the shot force may be determined in very accurately from the energy transferred and the time curve. Beside the shot force, the overall energy may also be displayed. This allows to obtain information about the type of shot. Thus, the ball may be played with much more precision on an even energy supply. Thus, if the duration of the energy supply is displayed additionally, for which purpose additional detection means may be provided, this may also be trained.

The energy may be used to infer the flying speed the ball has obtained. To this end, the weight and aerodynamics of the ball are taken into account. The flying speed determined is the value that is reached when the ball may fly off freely after the shot. In addition to the action of force, the time of the ball being hit, and the time of the ball touching down may also be determined using pressure sensor 10 and/or the acceleration sensor. By means of the force information and the time duration of the flight, it is quite readily possible to calculate the distance the ball must have flown.

In addition, components such as at least one Hall sensor 16, at least two magneto-resistive sensors or at least two coils may be provided for determining the rotational speed of game device 7. This information may be used for training so-called "curling crosses" in football. To this end, it is important for the user to immediately get a feedback about his/her shot. For this purpose, the rotational speed within the ball is measured and transmitted via radio 1 to the player's 6 data detection device 12. The components are to be arranged such that during their movement when the game device 7 is rotating in an energy field, a modulation frequency determinable by the evaluation unit 13 will result which can be converted into the rotational speed.

For example, the sensor, e.g. the Hall sensor 16, measures the earth's magnetic field and determines the field strength. When the ball rotates, the field strength undergoes a modulation. The frequency of the modulation is directly proportional to the rotational speed of the ball. During the measurement of the earth's magnetic field, the directional vector of the magnetic field is determined. The rotation of this vector is proportional to the rotation of the ball. Alternatively, the field strength may be measured with magneto-resistive sensors as resistors depending on the magnetic field. They may be connected to form a bridge. The output signal of the bridge may be amplified using a differential amplifier. The output voltage is a direct measure of the field strength of the magnetic field. For the purposes of measuring the rotation, neither a linearity of the voltage nor a determination of the direction of the field is required. When the ball rotates, the output voltage has an alternating voltage superimposed on it, the frequency of which is the rotational frequency of the ball. The frequency of this alternating voltage is the rotational frequency of the ball. Evaluation of this voltage may either be performed discretely via an analog circuit or using a microcontroller. To obtain a signal that can be evaluated for each possible axis of rotation of the ball, two sensors offset by 90° are used.

The field strength may also be measured using the Hall sensor 16. Hall sensors generate a voltage in proportion to the field strength. This voltage may be amplified using a differential amplifier. The output voltage is a direct measure of the field strength of the magnetic field. For the purposes of measuring the rotation, neither a linearity of the voltage nor a determination of the direction of the field is required. When the ball rotates, the output voltage has an alternating voltage superimposed on it, the frequency of which is the rotational frequency of the ball. Here, too, two sensors are preferably arranged such that they are offset by 90 degrees relative to one another.

Alternatively, it is also possible to make coils rotate in a magnetic field, so that a voltage is induced in the coils. The frequency of the voltage is proportional to the rotational frequency. However, the voltage must be amplified and filtered, since the coils may also act as antennas. Here, too, a discrete evaluation or an evaluation via the microcontroller is possible, and preferably two coils are arranged such that they are offset by 90 degrees relative to one another.

To determine the rotational speed, radio transmitters may also be used. In this case, the change of the field strength of any radio transmitter, for example a medium-wave transmitter, is used. The frequency of the change in field strength is proportional to the rotational frequency. Beside a dipole, a coil or a ferrite antenna may be used as an antenna. Since there are enough active long-, medium-, and short-wave transmitters in each country, there is no need in the system to operate one's own transmitters. If transmitters having a relatively high frequency are to be used as the reference, a dipole antenna is a possibility, which dipole antenna may be deposited, for example, on the ball's electronic system or even on the ball's envelope in the form of conductive traces. A frame antenna is suitable for low frequencies. It may be deposited as a coil in the form of conductive traces for assembly 15 of the ball's electronic system. A ferrite antenna is suitable for low frequencies. It may be constructed to be very small and will nevertheless generate a relatively large output signal. With all antennas it is necessary for two receive directions to be built up, so that a signal can be measured at any axis of rotation. The only thing that is important with signal measurement is the field strength. For this purpose, an amplifier having a high level of dynamics is necessary. The amplification should be logarithmic, for example, so that the A/D converter of the microcontroller need not be too wide.

An extremely low-power microcontroller takes on the data and the control of the ball's electronic system. Said microcontroller is woken up at the start of the game. If the microcontroller has not observed any game for a relatively long period, it will automatically switch off. The main task of microcontroller 11, which may be integrated in the data detection device in the game device as well as, or in addition to, microcontroller 11, is to process the data such that it can be transmitted via radio 1 with as little energy as possible. The data is preferably transmitted several times via radio, e.g. via a 2.4 GHz radio link, so as to be able to correct any errors.

Current supply may be realized in two known ways. On the one hand, one may use an accumulator, which, however, requires charging equipment. On the other hand, one may use a primary battery 21 within the data detection device and a primary battery 22 within game device 7, it not being possible, however, for the latter to be replaced within the ball.

In the accumulator version, a charging coil is mounted within the ball, using which the accumulator may be loaded in an inductive manner. With the version including battery 22, the ball is supplied using lithium batteries. The capacitance is designed such that the functionality of the electronic system is ensured for 1000 hours. With an average playing time of 1 hour per day, the battery would last for three years.

Within data detection device 12, a transceiver is integrated as a receive unit 2. Said transceiver receives the data from the ball and/or can establish a connection to other data detection devices in order to exchange data. Transmission and reception of data takes place, e.g., within the 2.4 GHz band.

The transceiver may receive and transmit data. Thus, it is possible to couple the data detection devices to one another. Thereby, the ball contacts can be transmitted to the other data detection devices during the game, so that a very accurate statistical set of data will be created in the network so as to be able to judge the game. If need be, it is also possible, by means of the data transmission, to facilitate small computer games in which the users may play in a networked manner.

The data within data detection device 12 is processed using a relatively large microcontroller 11. This microcontroller is extremely low in its power consumption. The data is exchanged via the transceiver and visualized on a display unit 14.

The data processed is displayed using a graphic display. The display has an integrated controller, to which the microcontroller is connected. Operation is effected via several keys 20, the function of which is dynamic.

The current supply of data detection device 12 must be highly power-saving. Battery 21 may be replaced. Microcontroller 11 and the display are extremely power-saving. Data transmission is designed such that the transceiver is in operation only for a very short time in each case.

With the ball version including an accumulator, a charging station is necessary. Since there is no line connection to the ball's electronic system, it is necessary to inductively charge the ball in a known manner. To this end, the charging station comprises a transmitter coil with which the energy is transferred into the ball.

In order to be able to communicate with other evaluation units, it is necessary to convert the radio communication to a different protocol. Since it is with a probability of 99% that a common PC will be used, a conversion in accordance with, e.g., USB is envisaged.

Figure 4A:
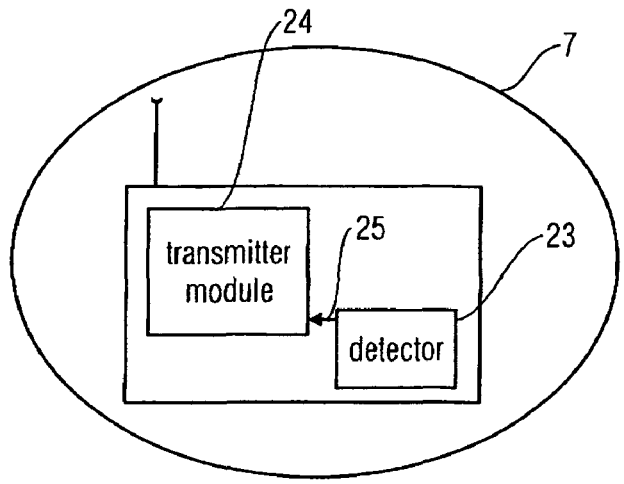
FIG. 4a is a more detailed view of the functional groups within the movable device.
Figure 4B:
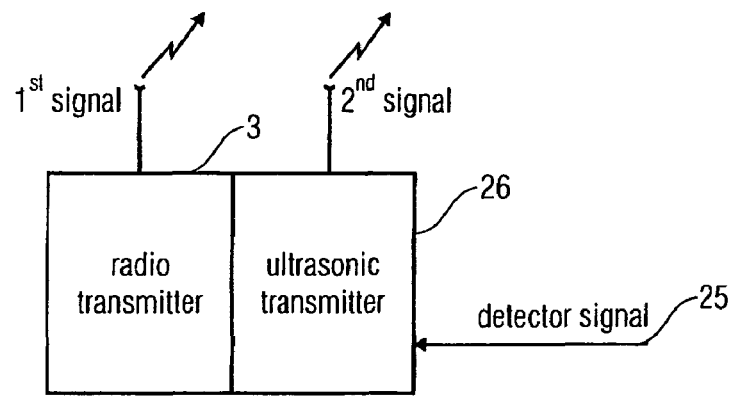

A more detailed description will be given below of the interacting components of the preferred concept, i.e. of the movable device of FIG. 4a and FIG. 4b, and of the receiver device of FIGS. 5a and 5b. Movable device 7 contains a detector 23 which may be, e.g., the pressure sensor 10 of FIG. 3 and which detects if ball 7 is touched. However, detector 23 may include a contactless sensor which operates in an electric, acoustic, optical or electromagnetic manner and detects, for example, whether a magnetic or electric field of any kind which is generated, e.g., by a respective transmitter within a football player's shoe approaches the ball. Detector 23 is configured to detect that an object, i.e., for example, a leg, a foot, a shoe, a racket, a bat, or the like, is positioned in the vicinity of or at the game device.

In addition, mobile device 7 includes a transmitter module 24 configured to transmit a first signal having a first signal speed, and to further transmit a second signal having a second signal speed which is smaller than the first signal speed. The transmitter module is configured to transmit the first and second signals in response to a detector output signal, as is shown by signal arrow 25 in FIG. 4a.

As has already been set forth, detector 23 is a touch sensor configured to detect the movable device being touched by the object. Such a touch sensor is, for example, the pressure sensor, however, it is also an acceleration sensor or any other sensor detecting whether the object engages with the surface of game device 7. Alternatively, the detector may also be configured as a contactless sensor which, as has been set forth, detects in some way that there is an object in the vicinity of the movable device. A contactless sensor which detects whether an object is located at a predetermined distance, which is smaller than or equal to 10 cm, from the movable device is suitable for specific embodiments. Then it is very likely for the object to actually touch the movable device, since the only aim is to cause the object to touch the movable device, for example when one thinks of a football as the movable device, or of a tennis ball. One may assume, with a probability of almost one hundred percent, that once the object is located within the predetermined distance, the object will eventually have contact with the movable device.

The transmitter module is configured to send two signals having different signal speeds. Preferably, a radio signal generated by radio transmitter 3 is used as the first, fast signal. The second signal is generated by a sound transmitter 26 preferably configured as an ultrasonic transmitter. Both transmitters are controlled by the detector signal supplied via line 25, so as to send both signals at the same time or essentially at the same time, i.e. within a period of, e.g., 1 to 2 ms, in response to the detector signal. Alternatively, however, the transmitters may be configured such that the radio transmitter sends the first signal at a specific moment determined by detector signal 25, and that the ultrasonic transmitter then waits for a predetermined time duration before the ultrasonic signal is transmitted. Here, the reception of the radio transmitter would also not immediately cause a chronometer to be activated on the receiver side, but the chronometer would be activated within a predefined time duration upon reception of the first signal, i.e. not immediately upon reception of the first signal, but depending on the reception of the first signal.

Alternatively, ball-contact detection could also be used to initially send the ultrasonic signal and then, after a specific time duration, the radio signal which will then overtake the ultrasonic signal, as it were, so that on the receiver side, a very short predetermined time duration is sufficient, within which the radio signal and the ultrasonic signal will arrive. However, it is preferred that both transmitters send their signals at the same time and that an accordingly longer predetermined time duration be employed on the receiver side, and/or that on the receiver side, the chronometer be started immediately upon reception of the radio transmitter.

The predetermined time duration depends on the difference of the speeds of the first, fast signal and the second, slow signal. The smaller this difference in speeds, the smaller the predetermined time duration that may be selected. The larger the difference in speeds, the longer the predetermined time duration that must be set. In addition, the predetermined time duration depends on whether the first and second signals are really sent at the same time, or whether the first and second signals are sent with an offset in time, a delay in the second signal with regard to the first signals leading to a delay in the start of the predetermined time duration, while a delay of the first signal relative to the second signal leads to a smaller predetermined time duration. In general, however, predetermined time durations of less than 5 ms are preferred, as has already been set forth.

Figure 5A:
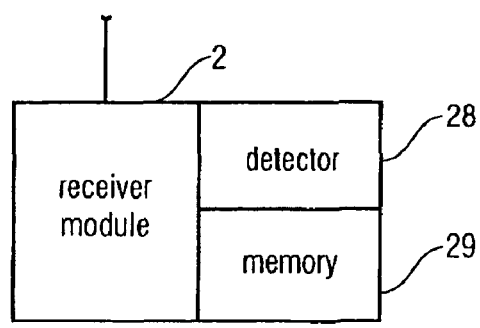
FIG. 5a is a block diagram representation of the receiver device.
Figure 5B:
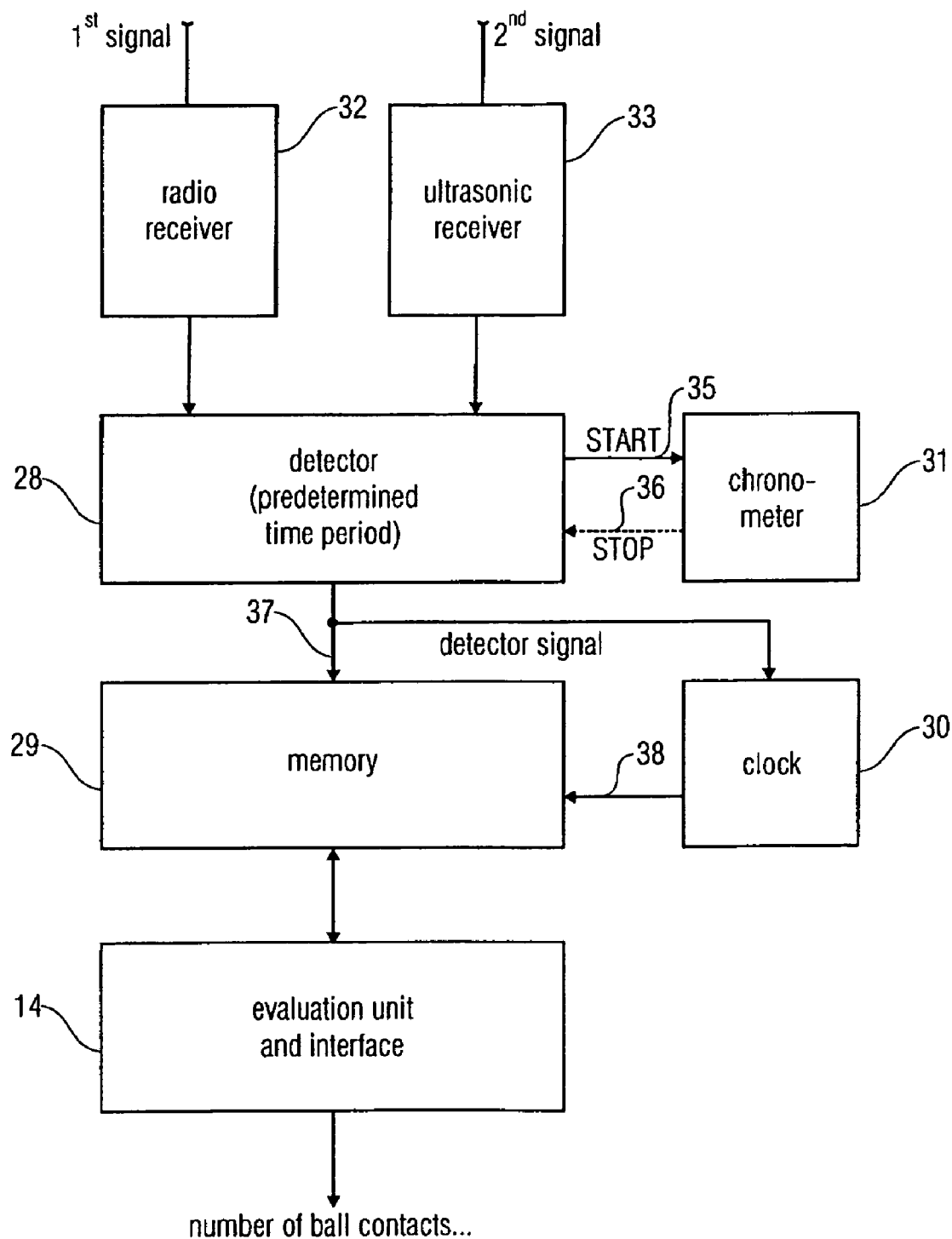

As is depicted in FIG. 5b, on the receiver side, the receiver module is in connection with a detector 28 which may be coupled to a memory 29 or which may be coupled to a further radio transmitter within the receiver device, which is not shown in FIG. 5a, however. The detector and memory 29 are preferably contained within evaluation unit 13 of FIG. 3. The receiver device overall shown at the bottom of FIG. 3, or the receiver device shown in FIG. 5a, is preferably configured such that it is integrated into a watch, or has the shape and looks of a watch, so that it may readily be worn by, e.g., a football player or a tennis player without said player being adversely affected in practicing his/her sport. Generally speaking, the receiver device is mountable to the object whose vicinity to the mobile device is detected by detector 23 in FIG. 4a, and comprises an appropriate fixing device which is not shown in FIG. 5a but which has the shape, for example, of a watchstrap, a fixture for a watchstrap, a clip or a different mounting device which may be secured in some way to the object and/or to a player.

The receiver module 2 is configured to receive the first signal having the first signal speed and the second signal having the second signal speed, which is smaller than the first signal speed. In addition, detector 28 is configured to provide a detector signal indicating whether the second signal has been received within a predetermined time duration since reception of the first signal. In addition, the detector is preferably coupled to memory 29 which is configured to store the moment when the detector provides the detector signal. Alternatively, a further transmitter may be present instead of the memory, the transmitter being configured to send the detector signal to a central detection point where, e.g., an online evaluation of ball contacts for the individual players is performed.

Such an online detection point would be, for example, a receiver arranged somewhere in the vicinity of a football pitch. In this case, any receiver device would send, on the output side, a contact with the movable device together with an identification for the player wearing the receiver device, so that indisputable statistical data can be obtained as to which player had how many ball contacts.

Recently, one has found that such information about ball contacts etc. are increasingly detected, shown and provided to a large audience and/or the commentator, for example, in football matches, so as to increase the information content for the viewers.

In the implementation with memory 29, for example, no central receiver device is required on the football pitch. Instead, the memory may be evaluated, for example, at half-time or at the end of the game, or in a contactless manner during the game without any interaction on the part of any player, so as to either obtain a count value for each player indicating how often the player had contact with the movable device. In this case, player 29 would be implemented as a counter incremented by 1 during each detection of the detector signal. Alternatively or in addition, the memory may also detect an absolute time of a clock, or watch, preferably contained within the receiver device and depicted at 30 in FIG. 5b. Then the memory would store a sequence of moments in time which may then be evaluated to be able to establish, for each player, a "ball-contact profile" over time. Here, it may also be possible to subsequently correct any erroneous detections that may have taken place, for example if one found out that more than two players had contact with the ball at the same time. Simultaneous contact of two players is relatively likely, for example when one thinks of a "50/50 ball". However, a contact of, e.g., three players with the ball at the same time, becomes very unlikely in football. However, in tennis, for example, a contact of two tennis rackets at the same time is already impossible, so that here, additional information about typical situations, in a sport, involving the movable game device may be used to perform an evaluation wherein errors may be eliminated.

FIG. 5b shows a more specific embodiment of the receiver shown in FIG. 5a. The receiver module comprises, on the one hand, a radio receiver 32 for receiving the first, fast signal, and an ultrasonic receiver 32 for receiving the second, slower signal. Radio receivers and ultrasonic receivers may also be configured differently, as long as they receive any signals having different signal speeds. Depending on a radio signal received, a detector 28 activates a chronometer 31 via a start line 35. Once a predetermined time duration and/or the predetermined time period has expired, the chronometer is stopped, which will typically be performed such that the chronometer 31, which is set to the predetermined time period, will provide a stop signal to the detector via a stop line 36.

If the detector detects an ultrasonic signal upon receiving the stop signal, no detector signal will be output on a line 37. In this case, it is actually assumed that the receiver device is located at such a long distance from the movable device that it is very likely for the movable device to not have been hit. However, if an ultrasonic signal is received by the detector before receiving the stop signal, i.e. before the predetermined time period has expired, the detector signal 37 will be output, which will then be stored by the memory, the memory being, for example, a counter incremented by 1 by the detector signal.

Alternatively, the detector signal is supplied to a clock, or watch, which performs absolute time measurement, which, e.g., may be an actual absolute time of the day, but which, e.g., is also an absolute time which begins, e.g., at the beginning of the game and is thus not directly an absolute time, but renders one minute of, e.g., a football game. At the time of the detector signal, clock 30 will then provide its current reading via a data line 38, so that the memory is then able to store this specific moment in time. A random evaluation of the players' activity may be performed by means of an evaluation unit having an interface, as may be implemented, for example, by display unit 14 in FIG. 3 or in FIG. 5b, which cooperates, in particular, with microcontroller 11 of FIG. 3.

Depending on the circumstances, the inventive methods may be implemented in hardware or in software. The implementation may be on a digital storage medium, in particular a disk or a CD with electronically readable control signals which may cooperate with a programmable computer system in such a manner that the respective method is performed. Generally, the invention thus also consists in a computer program product having a program code, stored on a machine-readable carrier, for performing the inventive method, when the computer program product runs on a computer. In other words, the present invention is thus also a computer program having a program code for performing the method of converting, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for measuring a shot force exerted on a movable game ball and the rotational speed of a movable game ball, comprising:

a processor integrated within said movable game ball;
a time curve provider within said movable game ball for providing a time curve for an attribute of a game ball when the game ball is impacted by an object with a shot force, wherein said attribute is selected from among an acceleration acting upon the object, and an internal pressure of the game ball;
wherein said processor is configured for processing the time curve of the acceleration or the time curve of the internal pressure to obtain an energy measure which depends on an energy transferred onto the object by the shot force, wherein the processor is further configured to provide information about an internal pressure of the game ball at rest prior to or after the shot, and wherein the processor is configured to integrate a pressure change of the pressure over the pressure at rest in order to obtain the energy measure;
wherein the time curve provider further comprises a memory having information about a previously determined group of curves stored therein, information about curves being stored for various pressures, wherein at least one curve includes a connection between a shot force and an energy measure,
wherein the time curve provider is configured to select a curve on the basis of the pressure at rest and to provide, on the basis of the energy measure, a shot force indicated by the curve selected;
a Hall sensor device integrated within said movable game ball and operatively coupled with said processor, said Hall sensor device configured to measure the earth's magnetic field, determine a magnetic field strength, and generate a voltage in proportion to said magnetic field strength;
an amplifier operatively coupled with said Hall sensor, said amplifier configured for amplifying said voltage;
wherein the magnetic field strength is modulated upon rotation of said movable game ball, thereby altering said voltage;
wherein said processor is further configured for determining the rotational speed of said game ball by analyzing said voltage and alterations thereof; and
an information provider for providing information about the shot force on the basis of the energy measure and for providing information about the rotational speed on the basis of said voltage analysis.

2. The device as claimed in claim 1, wherein the time curve provider comprises a sensor selected from among an acceleration sensor, a pressure sensor, and both an acceleration sensor and a pressure sensor, wherein said selected sensor is mounted to a game ball, or comprises a receiver configured to obtain time curves stemming from the movable game ball, or to obtain an energy measure.

3. The device as claimed in claim 1, wherein the processor is configured to temporally integrate the time curve, a result of an integration representing the energy measure.

4. The device as claimed in claim 1, wherein the processor is configured to examine the time curve for a maximum, a minimum, a shape, a time duration of a deviation, or any combination thereof from a normal value in a state at rest so as to obtain the energy measure.

5. The device as claimed in claim 1, wherein the shot force is a value on a shot-force scale, and wherein the provider is configured to map a value of the energy measure to a value of the shot-force scale in accordance with a predetermined mapping specification.

6. The device as claimed in claim 1, wherein the shot force is dependant on a distance, the movable game ball would cover when hit within a specific shot angle, and
wherein the time curve provider is configured to calculate the distance covered on the basis of the energy measure, a game-device weight and a game-device friction in air.

7. The device as claimed in claim 1, wherein the memory has a three-dimensional table stored therein, wherein a shot force is associated with different pairs of internal pressure and energy measure, and
wherein the time curve provider is configured to access the table as a function of the internal pressure and the energy measure, in order to determine the shot force.

8. The device as claimed in claim 1, wherein the time curve provider comprises information about different groups of curves for different types of game balls, and wherein the time curve provider is configured to identify, beside the internal pressure and the energy measure, also a type of the game ball on the basis of an input piece of information about the type of the game ball.

9. The device as claimed in claim 8, wherein the information provider is configured to obtain a piece of information about the type of the game ball via a radio signal from the game ball.

10. A computer readable memory device containing instructions for performing a method for measuring a shot force exerted on a movable game ball and a rotational speed of said movable game ball to produce useful and concrete information about the shot force wherein said information is embodied tangibly on a computer screen, the method comprising:

provided a time curve, which occurs when the game ball is impacted by an object, of an acceleration acting upon the object, or a time curve of a pressure of the game device;

processing the time curve of the acceleration or the time curve of the pressure to obtain an energy measure which depends on an energy transferred onto the object by the shot, wherein said processing further provides information about an internal pressure at rest prior to or after the shot, and wherein said processing further comprises integrating a pressure change of the pressure over the pressure at rest in order to obtain the energy measure;

accessing a memory having information about a previously determined group of curves stored therein, said information about curves being stored for various pressures, wherein at least one stored curve includes a connection between a shot force and an energy measurement;

selecting a curve on the basis of the pressure at rest and to provide, on the basis of the energy measure, a shot force indicated by the curve selected;

providing a Hall sensor device integrated within said movable game ball and operatively coupled with said processor, said Hall sensor device configured to measure the earth's magnetic field, determine a magnetic field strength, and generate a voltage in proportion to said magnetic field strength;

providing an amplifier operatively coupled with said Hall sensor, said amplifier configured for amplifying said voltage;

wherein the magnetic field strength is modulated upon rotation of said movable game ball, thereby altering said voltage;

wherein said processor is further configured for determining the rotational speed of said game ball by analyzing said voltage and alterations thereof; and providing information about the shot force on the basis of the energy measure and providing information about the rotational speed on the basis of said voltage analysis.

* * * * *